(12) United States Patent
Nakagaki

(10) Patent No.: US 7,877,763 B2
(45) Date of Patent: Jan. 25, 2011

(54) LENS DRIVE APPARATUS

(75) Inventor: Yasutaka Nakagaki, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 534 days.

(21) Appl. No.: 11/935,912

(22) Filed: Nov. 6, 2007

(65) Prior Publication Data

US 2008/0112279 A1    May 15, 2008

(30) Foreign Application Priority Data

Nov. 10, 2006  (JP) .................. JP2006-305382

(51) Int. Cl.
G11B 7/00      (2006.01)
(52) U.S. Cl. .................. 720/682; 369/44.16
(58) Field of Classification Search .............. 720/682, 720/683
See application file for complete search history.

(56) References Cited

U.S. PATENT DOCUMENTS

| | | | | |
|---|---|---|---|---|
| 5,216,648 A * | 6/1993 | Noda et al. | ............... | 369/44.14 |
| 5,453,881 A * | 9/1995 | Suzuki | ................ | 359/824 |
| 5,555,623 A * | 9/1996 | Goda | ................ | 29/896.9 |
| 5,745,447 A * | 4/1998 | Kang | ................ | 369/44.15 |
| 5,892,629 A * | 4/1999 | Nishihara et al. | ............ | 359/814 |
| 6,147,954 A * | 11/2000 | Murayama et al. | ..... | 369/112.23 |
| 6,768,601 B2 * | 7/2004 | Ju | ................ | 359/824 |
| 7,196,978 B2 * | 3/2007 | Iida et al. | ................ | 369/44.15 |
| 7,319,564 B2 * | 1/2008 | Yamada | ................ | 359/824 |
| 7,619,951 B2 * | 11/2009 | Kim et al. | ................ | 369/44.14 |
| 2001/0019519 A1 * | 9/2001 | Suzuki et al. | ........... | 369/44.16 |
| 2002/0054559 A1 * | 5/2002 | Choi | ................ | 369/244 |
| 2004/0114495 A1 * | 6/2004 | Kim et al. | ............. | 369/112.24 |
| 2004/0223423 A1 * | 11/2004 | Tsuda | ................ | 369/44.16 |
| 2005/0030845 A1 * | 2/2005 | Kim et al. | ................ | 369/44.26 |
| 2005/0128893 A1 * | 6/2005 | Iida et al. | ................ | 369/44.15 |
| 2006/0227677 A1 * | 10/2006 | Ogata et al. | ............. | 369/44.23 |
| 2008/0095017 A1 * | 4/2008 | Kawamura et al. | ..... | 369/112.24 |
| 2008/0112279 A1 * | 5/2008 | Nakagaki | ................ | 369/44.14 |
| 2008/0163278 A1 * | 7/2008 | Wakabayashi et al. | ...... | 720/681 |
| 2009/0059745 A1 * | 3/2009 | Kikuchi | ................ | 369/44.32 |

FOREIGN PATENT DOCUMENTS

JP     2006-190381     7/2006

* cited by examiner

*Primary Examiner*—Peter Vincent Agustin
(74) *Attorney, Agent, or Firm*—Finnegan, Henderson, Farabow, Garrett & Dunner, L.L.P.

(57) ABSTRACT

A lens drive apparatus for use in an optical pick-up apparatus, in which a bending mirror reflects an incident light flux from a light source and an objective lens converges the reflected light flux onto an optical disc through an objective lens, the lens drive apparatus includes: a base; a holder which holds the objective lens, being capable of moving with respect to the base; a pair of coils provided to interpose the objective lens held by the holder; and a pair of magnets attached to the base to face the pair of coils, respectively. The holder includes at least one surface which faces the incident light flux from the light source, among surfaces opposing to the pair of magnets, is shifted inwardly with respect to a surface of the holder that is close to the objective lens.

6 Claims, 5 Drawing Sheets

LENS DRIVE APPARATUS

This application is based on Japanese Patent Application No. 2006-305382 filed on Nov. 10, 2006, which is incorporated hereinto by reference.

BACKGROUND OF THE INVENTION

The present invention relates to a lens drive apparatus for an optical pick-up apparatus, particularly relates to a lens drive apparatus having a compact structure, which is capable of including a micro motor apparatus for driving a collimator lens.

Optical pickup apparatuses, which are capable of recording and/or reproducing information onto/from optical discs, such as CD and DVD have been developed. Development of the optical pick-ups, which are capable of recording and/or reproducing information onto/from optical discs, such as Blu-ray Disc and HD DVD by using a blue violet semiconductor laser diode having a wavelength of 400 nm have rapidly proceeded. Here, with respect to an object lens in the optical pick-up apparatus for forming a focal light spot, a focusing operation for appropriately forming a focal light spot on the information recording surface of the optical pick-up apparatus and a tracking operation for appropriately following a track of the optical disc are required when recording and/or reproducing information onto/from the optical disc. Further, in response to the high speed recording and reproducing of DVD, which has been increasing in recent years, in addition to those operations, a tilt operation for conducting aberration correction by adjusting the tilt of the object lens has been increasing. In addition to this, in the case of HD and DVD, since the thickness of the substrate is relatively thick and the numerical aperture of the object lens has been increasing, accurately conducting the tilt operation becomes important subject. Thus, Unexamined Japanese Patent Application Publication No. 2006-190381 disclosed a miniature size actuator for conducting focusing, tracking and tilt controls of the object lens.

In many cases, a cantilever actuator is used in a slim type or an ultra slim type optical pickup apparatus, which is installed into a note type personal computer, in order to install the optical pick-up to a limited size while maintaining the limitation of a thickness direction. However, there is a problem that higher frequency resonance performance cannot be improved due to the structure of the actuator and the widening of the frequency characteristic of the actuator is difficult. Further, error sensitivity is extremely high and the performance extremely deteriorates on the vibration, shock and environmental changes when operating the actuator. Thus, a symmetrical type actuator, in which driving coils are symmetrically disposed against the object lens, is preferable. However, when adopting the symmetrical type actuator, it is difficult to reduce the size in the optical axis direction and the size of the apparatus becomes large. Further, there is a limitation in the size when disposing parts. Particularly, in the recent optical pick-up apparatus, which is compatible for three wavelengths, a collimator lens is arranged to move in the optical axis direction to correct spherical aberration and to optimize the aberration. When disposing the movable collimator lens adjacent to the object lens, since a micro motor for driving the collimator lens needs to be installed in the optical pick-up apparatus, there is a problem that the space adjacent to the object lens is limited. Further, in the case of the symmetrical type actuator, there is a possibility that an arm section for moving the collimator lens touches to a magnetic circuit section of the actuator.

SUMMARY OF THE INVENTION

An object of the present invention is to provide a lens drive apparatus having a compact structure, which is capable of installing a micro motor apparatus for driving a lens collimator lens to solve the problems described above.

The lens drive apparatus of a first embodiment is a lens drive apparatus of an optical pick-up apparatus, in which a bending mirror reflects an incident light flux from a light source side and an objective lens converges the reflected light flux onto an optical disc via objective lens. The lens drive apparatus includes a base, a holder for holding the objective lens, the holder being capable of moving against the base, a pair of coils provided so as to sandwich the objective lens in the holder, and a pair of magnets attached to the base so as to oppose to the pair of coils, wherein the holder includes at least one surface, which faces the incident light flux from the light source, among surfaces opposing to the pair of magnets, shifts toward inside against a surface, which is close to the objective lens. Here, "the surface, which is close to the objective lens" denotes a surface, the center of which is close to the objective lens.

The lens drive apparatus of a second embodiment is a lens drive apparatus of an optical pick-up apparatus, in which a bending mirror reflects incident light flux from a light source side and an objective lens converges the reflected light flux onto an optical disc via objective lens, the lens drive apparatus includes a base, a holder for holding the objective lens, the holder being capable of moving against the base, a pair of coils provided so as to sandwich the objective lens in the holder, and a pair of magnets attached to the base so as to oppose to the pair of coils, wherein at least one surface among surfaces opposing to the pair of magnets, shifts toward an optical axis of the objective lens against an outer circumference of the objective lens.

The lens drive apparatus of a third embodiment is a lens drive apparatus of an optical pick-up apparatus, in which a bending mirror reflects incident light flux from a light source side and an objective lens converges the reflected light flux onto an optical disc via objective lens, the lens drive apparatus includes a base, a holder for holding the objective lens, the holder being capable of moving against the base, a resilient member for holding the holder, the resilient member extending from the base toward one side of the holder, a pair of coils provided so as to sandwich the objective lens in the holder, and a pair of magnets attached to the base so as to oppose to the pair of coils, wherein the holder includes at least one surface located on a side, to which the resilient member does not extend, among surfaces opposing to the pair of magnets, shifts toward inside against a surface, which is close to the objective lens.

DETAILED DESCRIPTION OF THE PREFERRED EMBODIMENT

An embodiment of the present invention will be described in detail by referring to drawings hereinafter.

Figure 1:
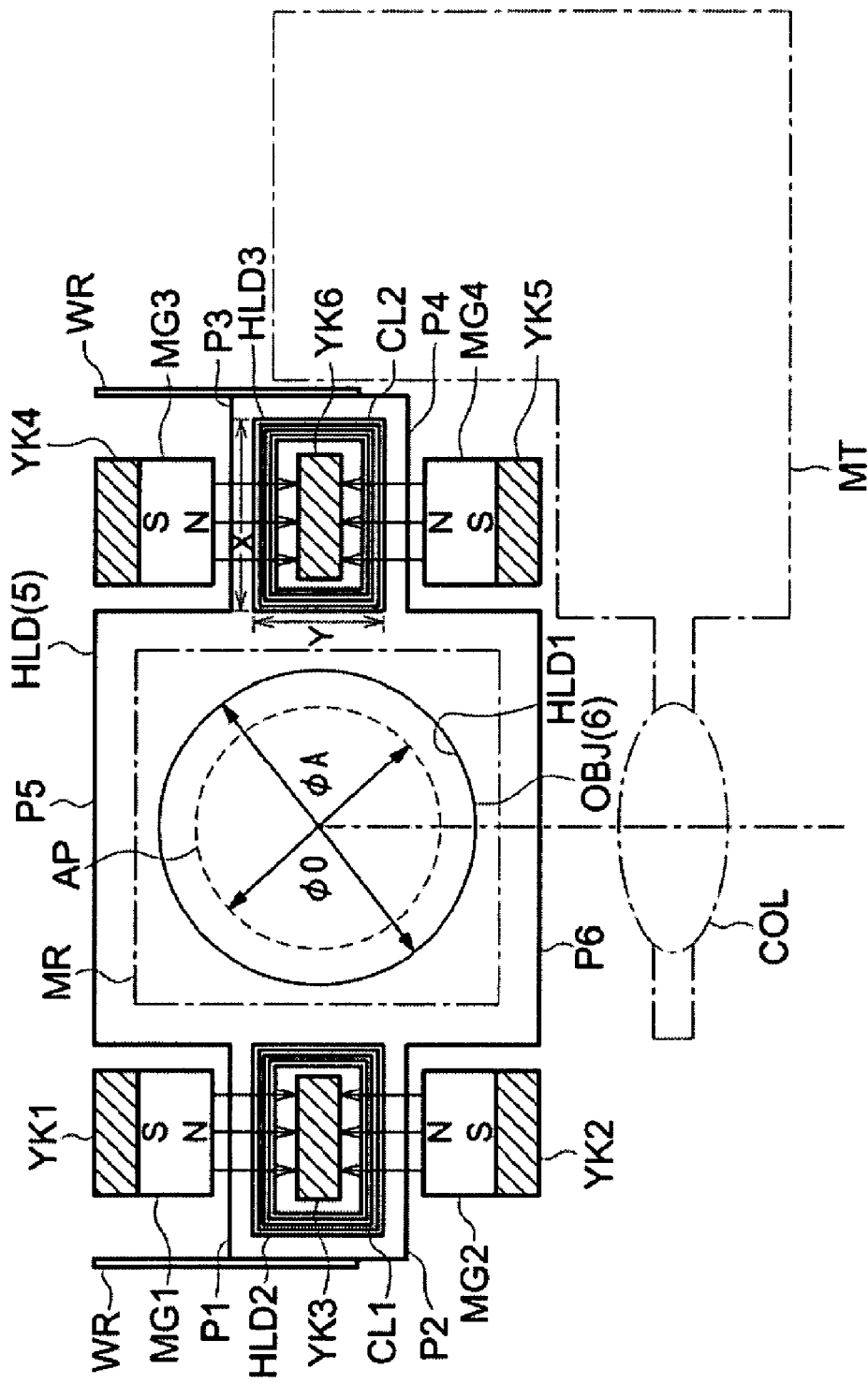
FIG. 1 illustrates the main section of the lens drive apparatus of an optical pick-up of an example of this invention viewed from the optical axis of the objective lens.

FIG. 1 illustrates the main section of the lens drive apparatus of the optical pick-up of an example of this invention viewed from the optical axis of the objective lens. In FIG. 1, a holder HLD (or 5 in FIG. 2) having a substantially cross shape viewed from the optical axis direction holds an objective lens OBJ (or 6 in FIG. 2) in a center opening HLD1. In both sides of the holder HLD (both side of the optical axis of a collimator lens COL, which will be described later), rectangular holes HLD2 and HLD3 have been formed. Coils CL1 and CL2 are disposed and fixed inside of the rectangular holes HLD2 and HLD3.

Yokes YK3 and YK 6 having respectively plate style are disposed inside coils CL1 and CL2. The yoke YK 3 fixed onto a base 1 (refer to FIG. 2) opposes to a magnet MG1 disposed upper side of FIG. 1 so as to sandwich the coil CL1 and opposed to a magnet MG2 disposed lower direction in FIG. 1. The magnets MG1 and MG2 are lined with the yokes YK1 and YK2.

On the other hand, the yoke YK 6 fixed onto a base 1 (shown in FIG. 2) opposes to a magnet MG3 disposed upper side of FIG. 1 so as to sandwich the coil CL2 and opposed to a magnet MG4 disposed lower direction in FIG. 1. The magnets MG3 and MG4 are lined with the yokes YK4 and YK5.

Here, the diameter of the opening HLD1 of the holder HLD is larger than the aperture AP (which is shown by a doted line) of the objective lens ($\phi O > \phi A$). Surfaces P1-P4 opposing to magnets MG1-MG4 are shifted to the inner direction (close to the optical axis of the objective lens OBJ) comparing with surfaces P5 and P6, which are close to the object lens. The reason for this will be described.

In the optical pick-up apparatus, to which the lens drive apparatus of the present invention is used, the light flux emitted from a light source (not shown) passes through a collimator lens COL. The light flux is perpendicularly reflected to the page space of FIG. 1 by a bending mirror provided in the lower and perpendicular direction of the page space. The light flux is converged onto the optical disc (not shown) via the objective lens OBJ. The motor apparatus MT is arranged to move the collimator lens COL.

In a slim or an ultra slim type optical pick-up apparatus, there is a requirement that the thickness of the objective lens in the optical axis direction has to be thin. Accordingly, the collimator lens COL and the bending mirror MR are disposed adjacent to the objective lens OBJ. In response to this, the micro motor apparatus MT for driving the collimator lens COL also approaches to the holder HLD. In this case, if the holder HLD is a rectangular shape (namely, the surface P4 does not shift against the surface P6 and both surfaces coincide), there is a possibility that the yoke YK5 or the magnet MG4, which is disposed outer direction for that amount, interferes with the motor apparatus MT. In order to avoid this, when detaching the motor apparatus MT from the holder HLD, the optical pick-up cannot be structured in a compact size. On the other hand, when forming the holder HLD in a long and narrow shape having a width of the surfaces P3 and P4, it is possible to avoid that the yoke YK5 or the magnet MG4 interferes with the motor apparatus MT. However, the objective lens having a large diameter cannot be installed.

According to the first embodiment, the surface P4 in the holder HLD, which opposes to the magnet MG 4 is shifted inside (close to the optical axis side of the objective lens) against the surface P6, which is close to the objective lens OBJ. Thus even though the objective lens having a large outside diameter can be installed, the interference between the motor apparatus and the yoke 5 or the magnet M can be avoided. Here, in the holder HLD, since it is enough that only the surface P4 is shifted from the surface P6, while, for example, surfaces P6, P2 and surfaces P1, P5 and P3 respectively coincide. It is feasible that, for example, any one or more than one surfaces, (P1, P2: P3, P4), which is close to the motor apparatus MT, may be shifted from the surface, which is close to the objective lens (P5: P6). However, from the viewpoint of balance, it is preferable that a symmetric type, in which surfaces P1, P2, P3 and P4 are shifted from the surfaces P5 and P6, as illustrated in FIG. 1.

Here, the bending mirror MR having a large reflect surface, which is large enough to project an image of an aperture AP, is needed. However, when a large sized bending mirror is disposed adjacent to the holder, there is a possibility to cause the interference with the holder HLD. According to the first embodiment, the surface P6, which is close to the objective lens OBJ, is shifted to outside against the surface P4 opposing to the magnet MG 4 in the holder HLD. (Namely, the surface P6 is shifted to the collimator COL side against the surface P4. In other words, the surface P4 is shifted inside against the surface P6). Based on this arrangement, it becomes possible to regulate the interference between the bending mirror MR having a large reflect surface, which is large enough to project an aperture AP, and holder HLD. In the case of the lens drive apparatus, which was disclosed in Unexamined Japanese Patent Application Publication No. 2006-190381, since the focusing coil is disposed circumference of the objective lens, the inner dimension of the coil cannot be smaller than the aperture. However, according to the first embodiment, the inner dimension of the coil can be arbitrarily determined.

According to the second embodiment, since the surface P4 opposing to the magnet MG4 in holder HLD (or 5 in FIG. 2) is disposed closer to the optical axis than the outer circumference of the objective lens OBJ (or 6 in FIG. 2), as describe above, even though the objective lens OBJ having a large diameter can be installed, it is possible to avoid the interference between the motor apparatus MT and the yoke YK5 or the magnet M4. Further, even though, it is a compact structure, the interference between the bending mirror MR having a large reflect surface, which is large enough to project an image of an aperture AP and the holder HLD can be regulated.

In FIG. 1, a wire WR, which is a resilient member, is extended from a base 1 (shown in FIG. 2) to the one side of the holder HLD (upper side in FIG. 1), the edge section of the wire WR holds the holder HLD against the base. According to the third embodiment, since the surface P4 opposing to the magnet MG4 in the holder HLD (6 in FIG. 2), the surface P4 being provided in the side where the wire WR is not extended, is shifted inside against the surface P6, which is close to the objective lens OBJ (6 in FIG. 2), even though the objective lens having a large diameter can be installed, the interference between the motor apparatus MT and the yoke YK5 or the magnet MG 4 can be avoided. Further, even though, it is a compact structure, the interference between the bending mirror MR having a large reflect surface, which is large enough to project an image of an aperture AP and the holder HLD can be regulated.

Figure 2:
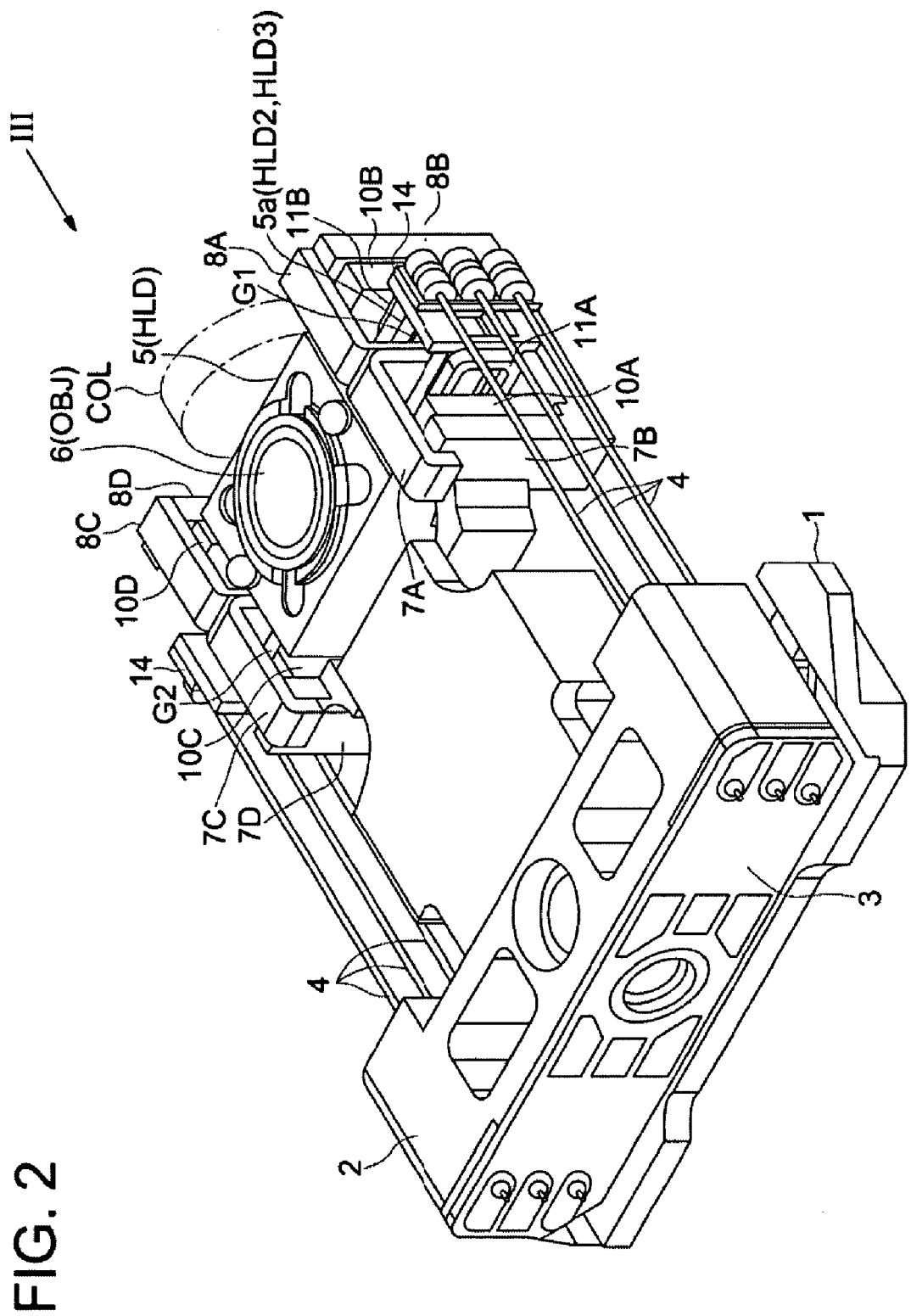
FIG. 2 illustrates a perspective view of the lens drive apparatus of an embodiment of the present invention.

FIG. 2 illustrated a perspective view of the lens drive apparatus of an embodiment of the present invention. A base 1 having a plate shape, which is also used as a yoke, is fixed onto the housing of the optical pick-up (not shown). A body 2 is fixed onto the base 1. A printed circuit board 3 is attached onto the body 2 in the front side on FIG. 2. Ends of the total six wires 4, three wires per a side, are fixed onto the printed circuit board 3. The wires 4 in each side are aligned with an equal interval to each other in parallel and extended along the base 1. The other ends of wires 4 are soldered on fixing parts 14 attached on the side surface of the holder 5. The wires 4 have functions for fixing the holder 5 onto the base 1 so as to freely move and for supplying electricity to the coil from the printed circuit board 3, which will be described later. Gel (not shown) having dumping effect of wires 4 is filled in the body 2.

The holder 5 (HLD in FIG. 1), which is formed by resin, is arranged to move against the base 1, has a substantially cross shape, which is superior in balance. The objective lens 6 (OBJ in FIG. 1) is installed in the opening (HLD1 in FIG. 1) formed in the center of the holder 5. This objective lens 5 is utilized to converge laser flux onto the information recording surface of an optical disc in the optical pick-up apparatus. Further, two opening 5a (HLD2 or HLD3 in FIG. 1) having a rectangular shape (shown only one opening located in front side) are provided in both sides of the holder 5.

Yokes 7A and 8A having a structure having a structure, in which L-shaped plates are connected back to back, are extended from upper side into the rectangular opening 5a in a front side. A first coil group G1 is disposed so as to surround the circumference of the yokes 7A and 8A. A magnet 10A is disposed in a front side and a magnet 10B is disposed in rear side across the rectangular opening 5a against the first coil group G1. The magnet 10A is lined with the yoke 7B and the magnet 10B is lined with the yoke 8B. Yokes 7B and 8B are a part of the base 1. The yoke 7A is connected to the upper end of the yoke 7B and the yoke 8A is connected to the upper end of the yoke 8B. Between the first coil group G1 and the magnets 10A and 10B, tracking coils 11A and 11B are disposed so that a winding wire axis is perpendicular to the first coil group G1.

On the other hand, in the rectangular opening in the rear side of the objective lens 6 corresponding to the rectangular opening 5a, yokes 7C and 8C having a structure, in which L-shaped plates are connected back to back, are extended from upper side into the rectangular opening. A second coil group G2 is disposed so as to surround the circumference of the yokes 7C and 8C. A magnet 10C is disposed in front side and the magnet 10D is disposed in rear side across the rectangular opening against the second coil group G2. The magnet 10C is lined with the yoke 7C and the magnet 10D is lined with the yoke 8D. Yokes 7D and 8D are a part of the base 1. The yoke 7C is connected to the upper end of the yoke 7D and the yoke 8C is connected to the upper end of the yoke 8D. Between the second coil group G2 and the magnets 10C and 10D, tracking coils (not shown in FIG. 2, 11D in FIG. 3) are disposed so that a winding wire axis is perpendicular to the second coil group G2.

Figure 3:
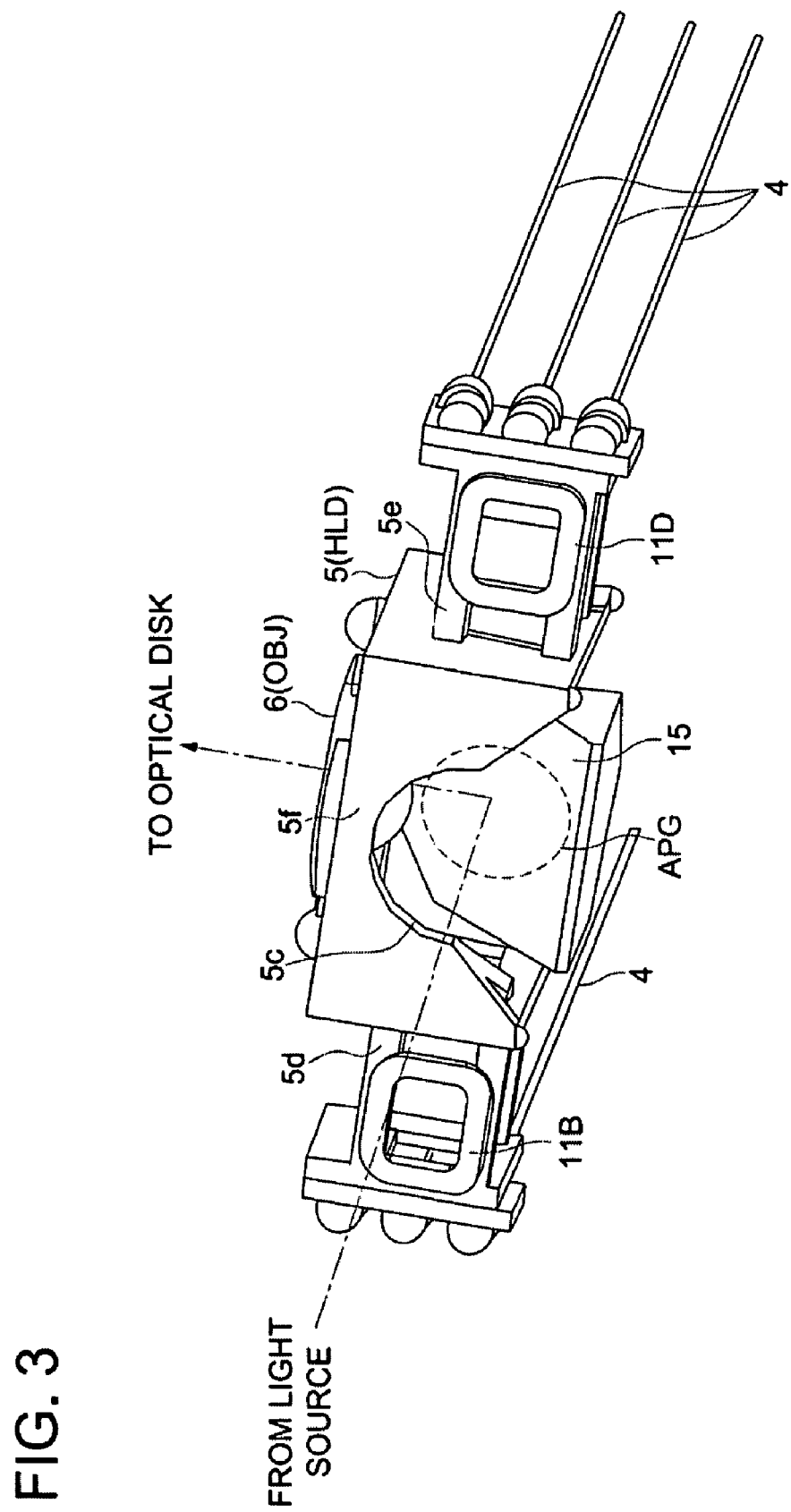
FIG. 3 illustrates an area adjacent to the holder in the lens drive apparatus of the embodiment of the present invention viewed from the arrow III direction in FIG. 2.

FIG. 3 illustrates an area adjacent to the holder in the lens drive apparatus of the embodiment of the present invention viewed from the arrow III direction in FIG. 2. The hollow holder 5 has a cutting portion 5c whose width becomes wider toward lower direction on the side surface of the holder 5. The bending mirror 15 is disposed adjacent to the objective lens 6 in the opening of the holder 5. As illustrated in FIG. 3, since the bending mirror 15 has the area, which is large enough to be able to project an aperture image APG (not shown), the cutting portion 5c is formed so that the objective lens 6 does not interferes with the holder 5 even though the objective lens 6 approaches to the holder 5.

Figure 4:
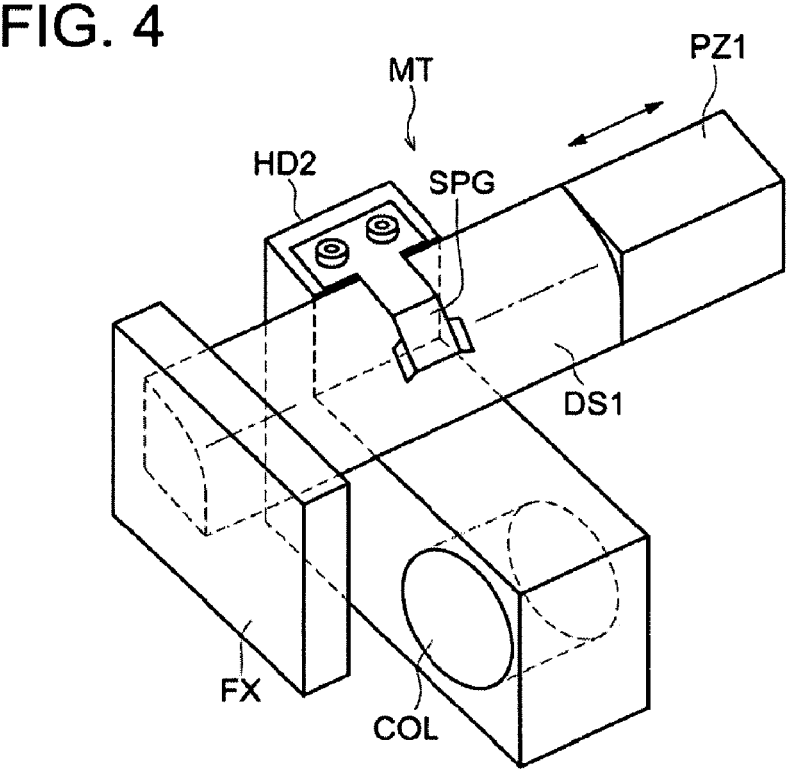
FIG. 4 illustrates a perspective view of a micro motor apparatus MT disposed adjacent to the lens drive apparatus.

FIG. 4 illustrates a perspective view of a micro motor apparatus MT disposed adjacent to the lens drive apparatus. In FIG. 4, a piezoelectric element PZ1, which is an electric mechanical conversion element, is fixed onto one end of a drive shaft DS1, which is a driving member. The other end of the drive shaft DS1 is fixed onto a fixed section FX of the optical pick-up apparatus. Further, a movable collimator lens is provided adjacent to the objective lens. A plate spring SPG is attached onto a holder HD2 having a L-shape, onto which the collimator lens COL is attached. The plate spring SPG biases the outer circumference of the drive shaft DS1 to the holder HD2.

Figure 5:
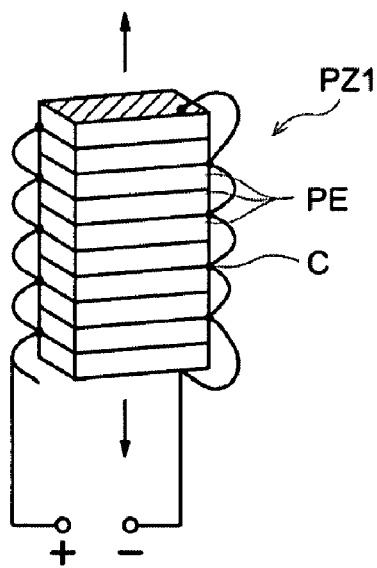
FIG. 5 illustrates a perspective view of a layered type piezoelectric actuator having a structure in which plural piezoelectric ceramics PE are layered and electrodes inserted between the piezoelectric ceramics PE are connected in parallel.

The piezoelectric element PZ1 is formed by layering a piezoelectric ceramics formed by PZT (zircon, lead zirconium titanate). In the piezoelectric ceramics, the gravity centers of a positive electric charge and a negative electric charge in the crystal lattice does not coincide. The crystal lattice itself is polarized. Thus, the piezoelectric ceramics has a characteristic that the length is prolonged by inputting the voltage in the polarized direction. However, since the distortion in this direction of the piezoelectric ceramics is minute and to drive the driven member by using this distortion amount is difficult, a layered type piezoelectric element having a structure, in which plural piezoelectric ceramics units PE are layered and the electrodes C between them are connected in parallel as shown in FIG. 5, is provided as a element which can be utilized in a practical use. In this embodiment, this layered type piezoelectric element is used.

Figure 6:
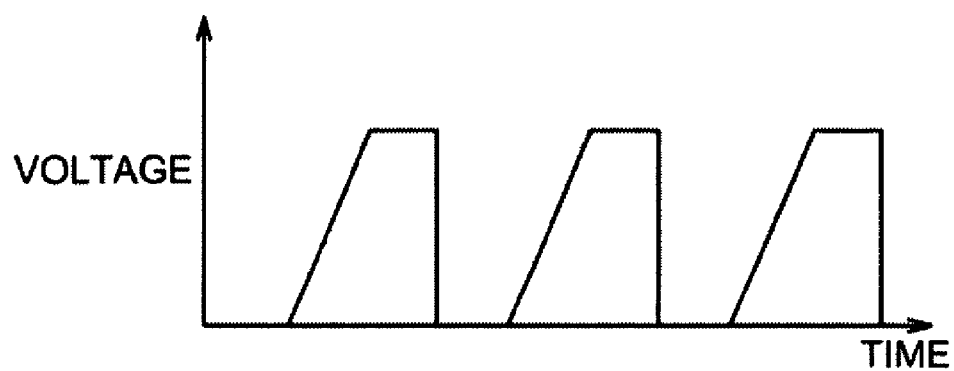
FIGS. 6(a)-6(b) illustrate waveform of voltage pulse, which is inputted to a piezoelectric actuator.
Figure 6:
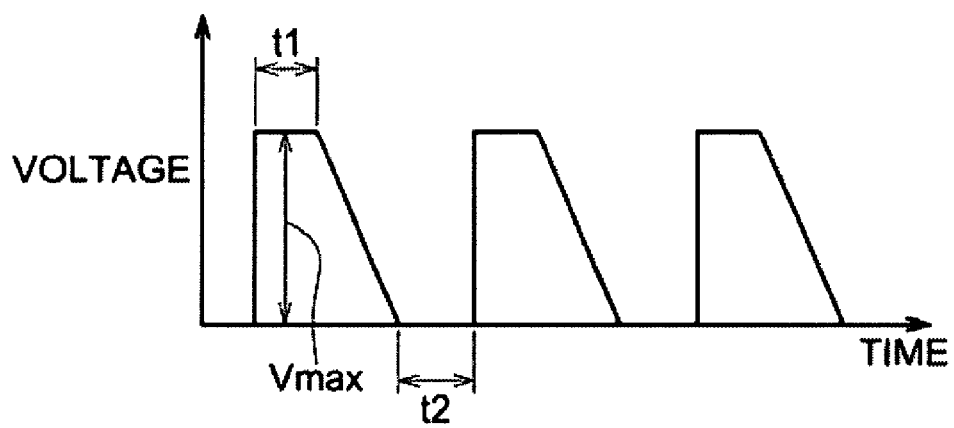

Next, a driving method of collimator lens COL by the micro motor apparatus MT will be described. In general, the layered type piezoelectric element PZ1 has a characteristic that a displacement amount is small when applying voltage, a generated force is large and response is sharp. Accordingly, as illustrated in FIG. 6(a), when a saw tooth waveform pulse voltage having a slow rising waveform and a sharp falling waveform, the piezoelectric element PZ1 slowly extends when the pulse waveform rises and sharply shrinks when the pulse waveform falls. Thus, when the piezoelectric element PZ1 slowly extends, the drive shaft DS1 moves and at the same time, the holder HD2, which is connected by the friction force, also moves. However, when the piezoelectric element PZ1 sharply shrinks, since, due to the inertia of the holder HD2, a relative shift occurs beyond the friction force between the drive shaft DS1 and the holder HD2, even though the drive shaft DS1 shifts, the holder HD2 stays at the same position. Based on this operation, it becomes possible to shift the holder HD2 for distance Δ by giving one pulse to conduct one stroke drive. Thus, when allowing the piezoelectric element 2 to conduct n-stroke drives, it is possible to move the collimator lens COL for distance "n×Δ" in the optical axis direction together with holder HD2. It is apparent that as illustrated in FIG. 6(b), when a saw tooth waveform pulse voltage having a sharp rising waveform and a slow falling waveform, it is possible to shift the collimator lens COL for an arbitrary amount in a reverse direction against the optical axis direction together with the holder HD 2.

Next, an operation of the lens drive apparatus of the embodiment will be described. Here, it is assumed that the first coil group G1 and the second coil group G2 respectively have two layer coils of an outside coil and an inside coil.

When the electric power is supplied to the first coil group G1 and second coil group G2 via the wire 4, the same amount of electric current having the same direction of the current (here counter clockwise) is arranged to flow in the outside coils of the first coil group G1 and the second coil group G2. Thus, based on the Flemings Left Hand Rule, magnetic forces heading to upper direction occurs in FIG. 2 respectively occur in those coils. Thus, the holder 5, onto which the first coil group G1 and the second coil group G2 have been fixed, moves upward in FIG. 2. Based on this operation, the objective lens 6 moves in the optical axis direction and a focusing operation can be realized. Here, by changing the electric current direction, the holder 5 can move lower direction.

On the other hand, when allowing the inside coil of the first coil G1 to flow electric current clockwise, and allowing the inside coil of the second coil G2 to flow electric current counterclockwise, based on the Flemings Left Hand Rule, a magnetic force heading upward is generated in one of inside coils in FIG. 2 and a magnetic force heading downward is generated by the other inside coil in FIG. 2. Thus, a momentum for declining the holder 5 centering on the optical axis position acts on the objective lens 6. Based on this, the tilt operation of the objective lens can be realized. Here, when reversing the electric current direction, the holder 5 can be reversibly declined. It is feasible that the tilt operation can be conducted by the outside coil and the focusing operation can be conducted by the inside coil.

Further, the length of the side opposing to the magnet (X in FIG. 1) of the coil is longer than the length of the side vertically crossing to the side opposing to the magnet (Y in FIG. 1). Based on this, the percentage of the portion passing through the magnetic field formed by the magnet to the total length of the coil increases and a coil efficiency can be improved. Further, the problems associated with thin type optical pick-up apparatus that the thermal affect to the objective lens when the coil generates heat can be solved.

Further, by allowing the tracking coils 11A-11D to flow electric current, it becomes possible to move the holder 5 in the direction, which is vertical to the optical axis, together with the objective lens 6 whereby a tracking operation can be conducted.

According to the lens drive apparatus of the embodiment, since the surfaces 5d and 5e opposing to the magnets 10B and 10D (FIG. 2) shift inside (closer to the optical axis of the objective lens 6) (referring to FIG. 3), even though the objective lens 6 having a large diameter can be installed, the magnets 10B and 10D can approach to the faces 5d and 5e. Thus, even though the motor MT for driving the collimator lens COL is provided in either side, the interference to the motor MT can be avoided (referring to FIG. 4).

Further, since the length of the holder HLD along the optical axis of the movable collimator lens is shorter than the length in the direction, which is vertical to the optical axis direction, the most compact structure, which avoids the contact to the bending mirror when conducting tracking operation, becomes possible.

Embodiment of the present invention have been described above. The present invention is not limited to the embodiment described above. It is apparent that modifications and improvement are possible. For example, the material of the lens holder is not limited to resin. The material of the lens holder may be metal alloy, such as, aluminum alloy or magnesium alloy.

According to the embodiments of the present invention, it becomes possible to provide a lens drive apparatus having a compact structure, which is capable of installing a micro motor apparatus.

What is claimed is:

1. A lens drive apparatus for use in an optical pick-up apparatus, in which a bending mirror reflects an incident light flux from a light source and an objective lens converges the reflected light flux onto an optical disc through an objective, lens, the lens drive apparatus comprising:
   (a) a base;
   (b) a holder which holds the objective lens, being capable of moving with respect to the base;
   (c) a pair of focusing coils provided to interpose the objective lens held by the holder, the focusing coils being provided on two opposing sides with respect to an optical axis of the objective lens; and
   (d) a pair of magnets attached to the base to face the pair of focusing coils, respectively,
   wherein the holder includes:
      a first plurality of side surfaces opposing the pair of magnets and facing the incident light flux from the light source; and
      a second plurality of side surfaces facing the incident light flux from the light source, the incident light flux passing through at least one of the second plurality of side surfaces, and
      wherein at least one of the first plurality of side surfaces is disposed in a position closer to the optical axis of the objective lens than the second plurality of side surfaces.

2. The lens drive apparatus of claim 1, wherein the light flux from the light source passes through a movable collimator lens and reflects on the bending mirror.

3. The lens drive apparatus of claim 2, wherein a length of the holder along an optical axis of the movable collimator lens is shorter than a length of the holder in a direction perpendicular to the optical axis of the movable collimator lens.

4. The lens drive apparatus of claim 2, further comprising: a motor device which drives the movable collimator lens, wherein the motor device is provided in a vicinity of at least one of the pair of magnets.

5. The lens drive apparatus of claim 2, wherein the movable collimator lens is provided in a vicinity of the objective lens.

6. The lens drive apparatus of claim 1, wherein each of the pair of focusing coils includes a first side opposing the magnets and a second side disposed in a direction perpendicular to the first side, and
   wherein a length of the first side is longer than a length of the second side.

* * * * *